United States Patent
Gudaitis

(12) 
(10) Patent No.: US 7,227,673 B2
(45) Date of Patent: Jun. 5, 2007

(54) COLOR MEASUREMENT WITH DISTRIBUTED SENSORS IN A COLOR HARD COPY APPARATUS

(75) Inventor: Algird M. Gudaitis, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1211 days.

(21) Appl. No.: 09/768,662

(22) Filed: Jan. 23, 2001

(65) Prior Publication Data

US 2002/0097454 A1 Jul. 25, 2002

(51) Int. Cl.
*H04N 1/46* (2006.01)

(52) U.S. Cl. ............ 358/501; 358/504; 356/402; 356/420; 250/226; 250/208.1; 382/167

(58) Field of Classification Search ............ 358/1.5, 358/1.59, 3.23, 501–504, 518–519, 401, 358/400; 250/208.1, 226, 569; 356/402, 356/419, 407, 420, 319, 320; 382/167; 235/462.41
See application file for complete search history.

(56) References Cited

U.S. PATENT DOCUMENTS

| | | | |
|---|---|---|---|
| 4,003,660 A * | 1/1977 | Christie et al. ............ 356/407 |
| 5,107,332 A | 4/1992 | Chan ............................ 358/80 |
| 5,508,826 A * | 4/1996 | Lloyd et al. ................ 358/501 |
| 5,671,059 A | 9/1997 | Vincent ...................... 356/402 |
| 5,844,663 A | 12/1998 | Holley et al. ................. 355/32 |
| 5,914,744 A | 6/1999 | Ng .............................. 347/237 |
| 5,929,999 A | 7/1999 | Butterworth ................ 356/405 |
| 6,002,498 A | 12/1999 | Haraguchi et al. .......... 358/518 |
| 6,036,298 A | 3/2000 | Walker ........................ 347/19 |
| 6,042,213 A | 3/2000 | Hayasaki ..................... 347/19 |
| 6,061,078 A | 5/2000 | Ng et al. ..................... 347/237 |
| 6,069,973 A * | 5/2000 | Lin et al. .................... 382/167 |
| 6,384,918 B1 * | 5/2002 | Hubble et al. .............. 356/402 |

* cited by examiner

*Primary Examiner*—Aung Moe
*Assistant Examiner*—Heather D Gibbs

(57) ABSTRACT

A method and apparatus for color measurement using a physically distributed multiplicity of sensors. Broad band illumination is provided to irradiate a test pattern. The sensors are used to measure color characteristics of discrete areas of a region of the pattern that has an intended single color by providing the pattern and sensors arrayed in a substantially matching geometric configuration.

15 Claims, 2 Drawing Sheets

COLOR MEASUREMENT WITH DISTRIBUTED SENSORS IN A COLOR HARD COPY APPARATUS

BACKGROUND OF THE INVENTION

1. Field of the Invention

The present invention relates generally to colorimetry, more specifically to color hard copy apparatus, and, more particularly, to an apparatus for color measurement using a physically distributed multiplicity of sensors.

2. Description of the Related Art

Color hard copy apparatus are commercially available for printing color images from digital alphanumeric text and graphic or photographic image data. While the data source may have excellent color gamut representation capability, the printed images produced can be affected by unpredictable variations in the writing instruments, the print medium, and the ambient atmospheric conditions. For example, in an ink-jet printer, inconsistencies of ejected ink drop size (volume generally measured in picoliters), ink dot interactions on the media, ink-media interactions, ink chemical composition from batch-to-batch, and local temperature and humidity can result in a printed color not closely matching the desired color as represented by the data.

Digital color print quality benefits greatly when color calibration techniques are employed. By measuring the actual color produced as well as knowing the desired color, it is possible to compensate for any recognizable difference between the two. Printing commands using correction factors can be modified in real time such that the commanded color deposition exactly, or at least within visual discrimination capability, matches the desired color.

Colorimetry is "any technique by which an unknown color is evaluated in terms of standard colors; the technique may be visual, photoelectric, or indirect by means of spectrophotometry." McGraw-Hill, *Dictionary of Scientific and Technical Terms*, Fourth Edition, Copr. 1989. A variety of apparatus for making color measurements exist. For example, an external instrument can be used to read a test print and the derived data can be analyzed for determining such correction factors. Spectrophotometers are highly accurate, but generally too expensive to integrate into a commercial printer, particularly common desktop computer peripherals and multifunction (printer/copier/facsimile) office products. Spectrophotometers use a broadband (wide range of frequencies) light emitter and sensor, relying on complex wavelength discriminating optical components (e.g., variable wavelength filters) to accurately measure color properties. The broadband spectrum is spit into multiple paths for detection at each of the desired wavelengths, or multiple filters are moved into the optical path from the observation spot to a single detector. Generally, thirty or more channels are being measured and a large effort is required to focus all channels on a small spot of color print. Note that in general, external instruments are inconvenient, requiring separate power, alignment apparatus, a user interface for communicating results to the hard copy apparatus, and user familiarity with calibration operations.

Lower cost type instruments, such as a densitometer or a colorimeter, can be employed. As examples, a densitometer device using a changeable filter arrangement, is disclosed by Lloyd et al. in U.S. Pat. No. 5,508,826, METHOD AND APPARATUS FOR CALIBRATED DIGITAL PRINTING USING A FOUR BY FOUR TRANSFORMATIO MATRIX (assigned to the common assignee herein); Haraguchi et al. in U.S. Pat. No. 6,002,498, describe a conversion function for obtaining analytical density for spectral density using a densitometer in an ink-jet printing apparatus.

Another prior art solution is to measure color patches with a multi-light-emitting-diode (LED) device. Intermediate accuracy levels are achieved by measuring the spectral characteristics of color test patches in more than two or three bands. LED devices have a drawback in not providing optical energy at short wavelengths. The LED's must illuminate the same, relatively small, color test patch, imposing unnecessary design constraints. Moreover, the effect of fluorescing "brighteners" that media vendors incorporate into their paper products is not detectable.

Kent Vincent, in U.S. Pat. No. 5,671,059 (assigned to the common assignee herein) for an ELECTROLUMINESCENT COLOR DEVICE, has multiple electroluminescent emitters and a broadband sensor forming a colorimeter. The emitters produce light covering spectral segments determined by a filter layer and an active layer wherein the spectral segments sufficiently cover the visible spectrum to enable a wide range of colors to be accurately measured.

Another prior art method is described by Hayasaki in U.S. Pat. No. 6,042,213 for a METHOD AN APPARATUS FOR CORRECTING PRINTHEAD, PRINTHEAD CORRECTED BY THIS APPARATUS AND PRINT APPARATUS USING THIS PRINTHEAD. A CCD camera and image processing is used during printhead manufacture to provide correction data for adjusting the amount of ink discharged from each nozzle.

Another prior art method is describe by Chan in U.S. Pat. No. 5,107,332 for a METHOD AND SYSTEM FOR PROVIDING CLOSED LOOP COLOR CONTROL BETWEEN A SCANNED COLOR IMAGE AND THE OUTPUT OF A COLOR PRINTER (assigned to the common assignee herein and incorporated herein by reference). A digital data processing method for continuously correcting for error in color output from a scanned image is described.

There is a need for an accurate, inexpensive, on-board, color measurement apparatus for measuring actual color produced by a hard copy apparatus on currently used media so that compensation for the difference between actual and desired values can be made with digital data processing techniques to modify printing commands accordingly and make real time corrections.

SUMMARY OF THE INVENTION

In its basic aspects, the present invention provides a system for color measurement for a color hard copy apparatus, having a print media transport path, including: a illumination source adjacent to said path; a plurality of photodetectors adjacent to said path; and a test pattern on a sheet of media traveling said path, the pattern having a geometric configuration such that each of said photodetectors detects substantially discrete regions of said pattern having a single color generated by said apparatus.

In another aspect, the present invention provides a color hard copy apparatus, having a mechanism generating a test pattern on media transported along a predetermined path through said apparatus, including: adjacent said path downstream of the mechanism, a broad band illumination source mounted for illuminating said pattern; and adjacent said path downstream of the mechanism, an array of sensors mounted for detecting color properties of discrete areas of a region of the test pattern having an intended uniform color generated by the mechanism.

In another aspect, the present invention provides a method for measuring actual color produced by a color hard copy device including steps of: illuminating with broad band light, a region of a color test pattern generated by the device, wherein said region has a first color generated by the device; discretely sensing actual color characteristics of individual areas of said region; and storing data representative of said color characteristics.

The foregoing summary is not intended by the inventor to be an inclusive list of all the aspects, objects, advantages, or features of the present invention nor should any limitation on the scope of the invention be implied therefrom. This Summary is provided in accordance with the mandate of 37 C.F.R. 1.73 and M.P.E.P. 608.01(d) merely to apprise the public, and more especially those interested in the particular art to which the invention relates, of the basic nature of the invention in order to be of assistance in aiding ready understanding of the patent in future searches. Other aspects, objects, advantages, and features of the present invention will become apparent upon consideration of the following explanation and the accompanying drawings, in which like reference designations represent like features throughout the drawings.

The drawings referred to in this specification should be understood as not being drawn to scale.

DESCRIPTION OF THE PRESENT INVENTION

Reference is made now in detail to a specific embodiment of the present invention which illustrates the best mode presently contemplated by the inventor for practicing the invention. Alternative embodiments are also briefly described as applicable.

Figure 1:
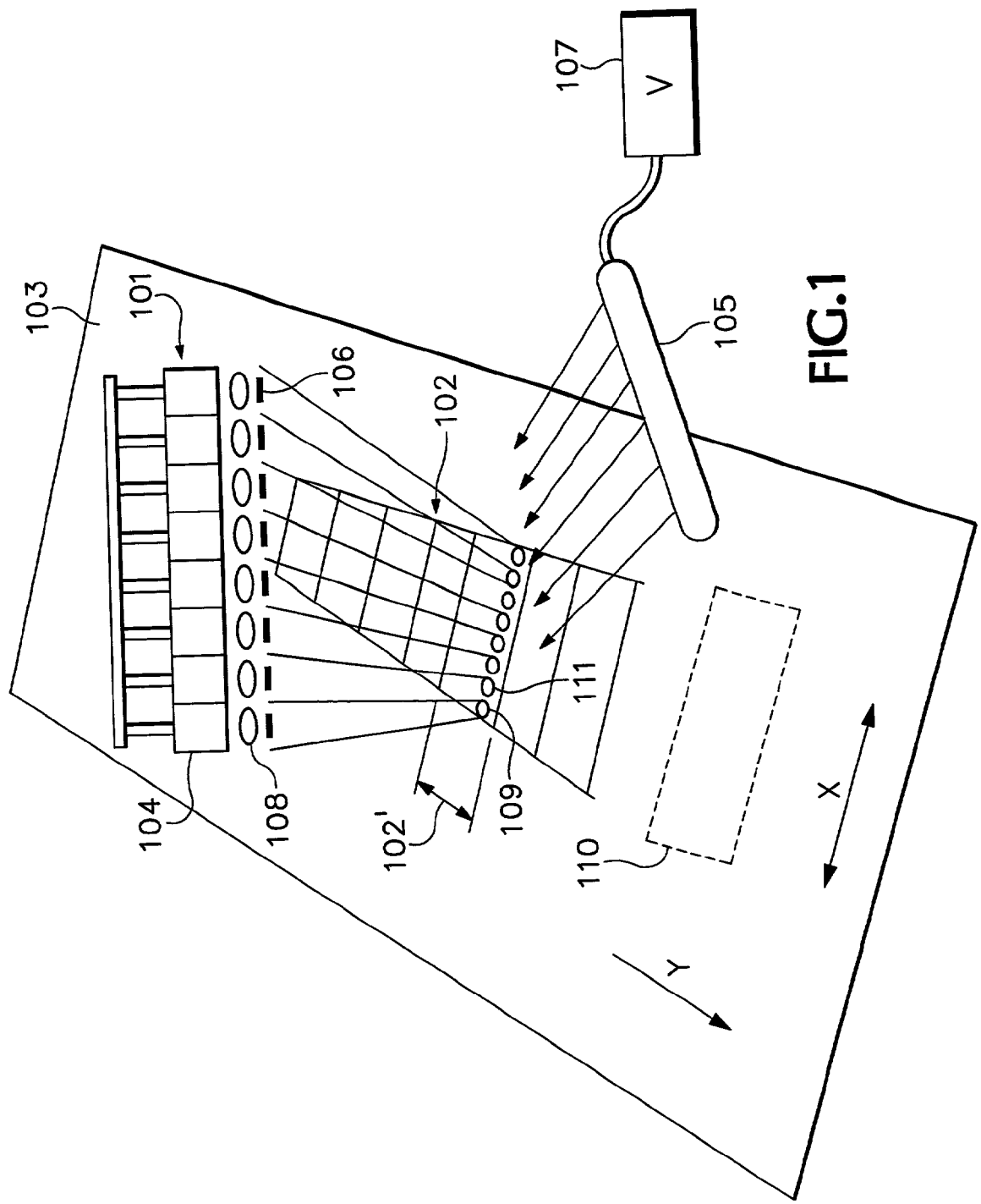
FIG. 1 is a schematic depiction of a multiple sensor, color measurement system in accordance with the present invention.
Figure 2:
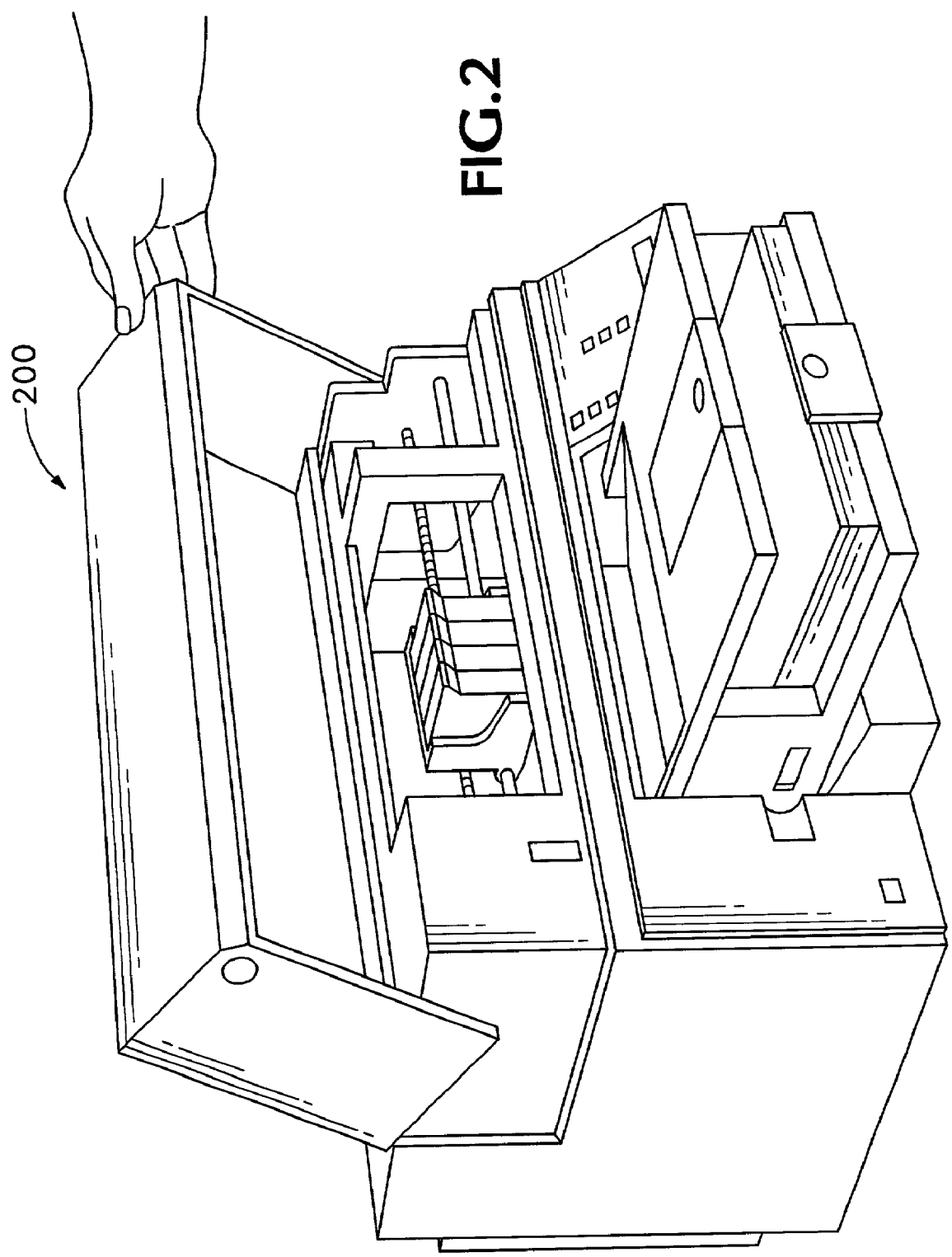
FIG. 2 (Prior Art) is an exemplary ink-jet printer in which the present invention may be employed.

FIG. 1 is a schematic representation of a color measurement system in accordance with the present invention. Ink-jet printing technology is used as an exemplary embodiment. The art of ink-jet technology is relatively well developed. Commercial products such as computer printers, graphics plotters, copiers, facsimile machines, multifunctional peripheral ("MFP") hard copy apparatus employ ink-jet technology for producing hard copy. The basics of this technology are disclosed in various articles in the *Hewlett-Packard Journal*, for example, Vol. 36, No. 5 (May 1985), Vol. 39, No. 4 (August 1988), Vol. 39, No. 5 (October 1988), Vol. 43, No. 4 (August 1992), Vol. 43, No. 6 (December 1992, and Vol. 45, No. 1 (February 1994) editions. Ink-Jet devices are also describe by W. L. Lloyd and H. T. Taub in *Output Hardcopy Devices*, chapter 13 (Ed. R. C. Durbeck and S. Sherr, Academic Press, San Diego, 1988). A typical exemplary printer 200 in which the present invention may be employed is illustrated by FIG. 2.

In general, the invention uses a fixed array 101 of multiple sensors for observing neighboring positions of relatively long, intended uniform color, strips (e.g., 102') of a test pattern 102. The pattern 102 has a plurality of such strips printed on a test sheet of print medium 103 by the hard copy apparatus (not shown) into which the present invention is implemented. State of the art full color, scanning ink-jet printheads create a swath approximately an inch high in the media transport axis (see arrow labeled "Y"). Test bands approximately five inches long in the scanning axis (see arrow labeled "X") are preferred. Similar test bands of colors of interest can be generated with pens, laser-toner, thermal, or other color hard copy apparatus printing engines or individual writing instruments.

The array 101 is mounted downstream from the printing engine, thus taking advantage of the media transport devices inherent to the hard copy apparatus. By placing the array 101 in the paper path, multiple test bands 102 of color can be sequentially examined without any mechanical effort by the array.

A single illumination source 105, spectrally broad band—such as a halogen or xenon fluorescent lamp having an appropriate power supply 107—projects incident light (represented by arrows) onto the test pattern 102. A xenon lamp has the advantage of providing enough optical energy at short wavelengths to excite the fluorescence of paper brighteners, thus providing a more realistic measure of visually perceived color. Spectral information from the illuminated pattern is analyzed in any known manner data processing technique as would be specifically advantageous for a particular implementation. Alternatively, spectral information can be determined by using different color LED's for each of the sensors (if desired in some implementations) or by using different filters (of various spectral characteristics) in front of the detectors and a single spectrally broadband illumination source such as a halogen or fluorescent lamp. In addition, the detectors can be discrete photodetectors or elements of a photodetector array.

The array 101 is appropriately mounted in the X-axis parallel to the test band orientation on the print medium 103. Individual sensors 104 of the array can be discrete photodetectors, each having an optical filter 106 of particular, narrow, spectral characteristics. Such photodetectors are commercially available from the Texas Advanced Optoelectronics Solutions company of Plano, Tex. Note that the individual sensors 104 can be discrete elements of a pre-manufactured array. Each sensor 104 has a focusing lens 108 for a discrete area 109, 111 (et seq. as shown in FIG. 1) of the test band 102 within the field of view of the array (the field of view is represented by diverging lines between each filter 106 and a spot representing the respective discrete area 109 of view for each sensor 104.

Alternatively, each individual sensor 104 of the array 101 can be an LED and photodetector pair with different LED color devices. Such LEDs are commercially available from the Agilent Technologies company of Palo Alto, Calif.

By using a relatively long illumination source 105, namely, about the same length as the test band 102, uniformly lighting the media, inexpensive discrete filters 106 can be employed to measure the spectral components of physically adjacent but identical color areas 109 within each test band. Thus, no mechanical effort is needed to interpose each of the filters in turn between the color patch and a detector 104, providing an advantage over the Lloyd et al. patented apparatus described in the Background hereinabove.

In operation, the printing engine is used to print a test pattern 102 of uniform strips 102', each of an intended predetermined color, for example, a cyan strip, a magenta strip, a yellow strip, a red strip, a blue strip and a green strip, each having various chroma levels. All of the colors have intended color characteristics which can be stored in a look-up table (LUT) type memory. As the paper is transported in the Y-axis and positioned for printing the next sequential color strip, the first strip enters the field of view of the array 101. Information generated by the array 101 can then be stored in a conventional memory and used for comparison to the appropriate corresponding data in the LUT. Correction factors are generated for use by the printing engine in rendering images. {In general, in terms of color matching, light sensations can be represented by specifying three independent functions of wavelength that are identified with an ideal observer's color matching capability; international standards for specifying color have been adopted accordingly to specify color stimuli by three-dimensional spatial constructs referred to as "tristimulus space" or simply "color space." The fundamentals of such and associated data processing are discussing in the literature, such as *Principles of Color Technology*, by Billmeyer and Saltzman, published by John Wiley & Sons, In., NY, copr 1981 (2d ed.) and *Color Science: Concepts and Methods, Quantitative Data and Formulae*, by Wyszecki and Stiles, published by John Wiley & Sons, Inc., copyright 1982 (2d ed.). A variety of tri-variable color models are described by Foley and Van Dam in *Fundamentals of Interactive Computer Graphics*, Addison-Wesley Publishing Company. Such techniques can be employed in conjunction with the present invention.}

A refinement of the present invention uses a white calibration target 110 in the normal field of view of the array 101 and then a sheet of the print media is interposed between the array 101 and the target as it is moved from input to output. Without the sheet interposed, a sensor black level with the light source 105 off and white level calibration can be performed with the light source on. Color strip measurements can be offset and scaled appropriately between the black and white levels.

Note that for specific implementations, the present invention is easily scaled to fewer or greater numbers of spectral sensing bands depending on accuracy design goals and specifications.

The foregoing description of the preferred embodiment of the present invention has been presented for purposes of illustration and description. It is not intended to be exhaustive or to limit the invention to the precise form or to exemplary embodiments disclosed. Many modifications and variations will be apparent to practitioners skilled in this art. For example, other geometric configurations of the array and corresponding test pattern shapes can be employed. Similarly, any process steps described might be interchangeable with other steps in order to achieve the same result. The disclosed embodiment was chosen and described in order to best explain the principles of the invention and its best mode practical or preferred application, thereby to enable others skilled in the art to understand the invention for various embodiments and with various modifications as are suited to the particular use or implementation contemplated. It is intended that the scope of the invention be defined by the following claims and their equivalents. Reference to an element in the singular is not intended to mean "one and only one" unless explicitly so stated, but can mean "one or more." Moreover, no element, component, nor method step in the present disclosure is intended to be dedicated to the public regardless of whether the element, component, or method step is explicitly recited in the claims. No claim element herein is to be construed under the provisions of 35 U.S.C. Sec. 112, sixth paragraph, unless the element is expressly recited using the phrase "means for . . . ."

What is claimed is:

1. A system for color measurement for a color hard copy apparatus, having a print media transport path, comprising:
   an illumination source adjacent to said path;
   a plurality of photodetectors adjacent to said path; and
   a printing engine operable to form test strips each of a single color on a sheet of media traveling said path, each strip having a geometric configuration such that each of said photodetectors detects substantially discrete regions of that strip, the printing engine being further operable to generate at least one correction factor based on comparisons of measured spectral characteristics of the color strips with intended spectral characteristics of the color strips.

2. The system as set forth in claim 1, further comprising: said photodetectors having predetermined spectral responses.

3. The system as set forth in claim 1 wherein the illumination source is broadband.

4. The system as set forth in claim 1, further comprising: a white calibration target mounted within the field of view of all of said sensors.

5. A color hard copy apparatus that is operable to generate color strips, each of an intended uniform color on media transported along a predetermined path through said apparatus, comprising:
   adjacent said path downstream of the mechanism, a broad band illumination source mounted for illuminating said color strips;
   adjacent said path downstream of the mechanism, an array of sensors, each of the sensors mounted for detecting color properties of a unique one of discrete areas of each of the color; and
   a printing engine operable to generate at least one correction factor based on comparisons of detected color properties of the color strips with intended color properties of the color strips.

6. The apparatus as set forth in claim 5, comprising: said sensors having predetermined spectral responses.

7. The apparatus as set forth in claim 5 wherein the illumination source is broadband.

8. The apparatus as set forth in claim 5, further comprising:
   a white calibration target mounted within the field of view of all of said sensors.

9. A method for measuring actual color produced by a color hard copy device comprising:
   a) illuminating with broad band light, a region of a color pattern generated by the device, the color pattern having a first color;
   b) sensing actual color characteristics of discrete areas of said region using each of a plurality of sensors for the sensing of a unique one of the discrete areas; and
   c) generating at least one correction factor for a printing engine based on comparisons of sensed color characteristics of the discrete areas of the color pattern region with intended spectral characteristics of the color pattern region.

10. The method as set forth in claim 9, comprising the further steps of:
    printing a plurality of intended colors in addition to said first color with said device, and
    repeating steps a)–c) for each of the plurality of intended colors other than said first color.

11. The method as set forth in claim 9, comprising the further step of: prior to steps a)–c), calibrating each of said sensors using a white calibration target.

12. A hard copy apparatus, comprising:
    a printing engine operable to form color strips on a print medium, each of the color strips of an intended uniform color;
    an array of sensors located downstream from the printing engine along a direction of travel of the printing medium, the array oriented along an axis generally parallel to an orientation of the color strips, wherein as each of the color strips passes within view of the array, each of the sensors includes a photodetector and is positioned to measure a spectral characteristic of a unique one of a plurality of substantially discrete regions on each of the color strips; and means for obtaining correction factors based on differences between measured spectral characteristics of the color strips and intended spectral characteristics of the color strips.

13. The hardcopy apparatus of claim 12, further comprising an illumination source positioned to project incident light to illuminate the color strips as color strips pass within view of the array.

14. A color measurement system for use with color strips formed on a print medium, with each of the color strips of a single color, comprising:

an array of photodetectors oriented along an axis generally parallel to an orientation of the color strips so that as one of the color strips passes within view of the array, with each of the photodetectors positioned to measure a spectral characteristic of a unique one of a plurality of substantially discrete regions of the one of the color strips;

a means for determining differences, if any, between measured spectral characteristics of the color strips with intended spectral characteristics of the color strips; and a means for obtaining correction factors based on the determined differences, if any, the correction factors for use by a printing engine that formed the color strips.

15. A method, comprising:

forming a color strip of a single color on a print medium;

using each photodetector, of an array of photodetectors oriented along an axis generally parallel to an orientation of the color strip, to measure a spectral characteristic of a one of a plurality of substantially discrete regions, corresponding to the photodetector, of the color strip, as the color strip passes within view of the array;

comparing a measured spectral characteristic of the color strip with an intended spectral characteristic of the color strip; and generating a correction factor based on the comparing for use by a printing engine that formed the color strip.

* * * * *

UNITED STATES PATENT AND TRADEMARK OFFICE
CERTIFICATE OF CORRECTION

| | |
|---|---|
| PATENT NO. | : 7,227,673 B2 |
| APPLICATION NO. | : 09/768662 |
| DATED | : June 5, 2007 |
| INVENTOR(S) | : Algird M. Gudaitis |

It is certified that error appears in the above-identified patent and that said Letters Patent is hereby corrected as shown below:

In column 6, line 26, in Claim 5, delete "color;" and insert -- color strips; --, therefor.

Signed and Sealed this

Nineteenth Day of August, 2008

JON W. DUDAS
*Director of the United States Patent and Trademark Office*